United States Patent [19]

Kashiwabara

[11] Patent Number: 5,421,793
[45] Date of Patent: Jun. 6, 1995

[54] AUTOMATIC TRANSMISSON CONTROLLER

[75] Inventor: Masuo Kashiwabara, Atsugi, Japan

[73] Assignee: Unisia Jecs Corporation, Atsugi, Japan

[21] Appl. No.: 193,131

[22] PCT Filed: Jun. 18, 1993

[86] PCT No.: PCT/JP93/00828

§ 371 Date: Mar. 18, 1994

§ 102(e) Date: Mar. 18, 1994

[30] Foreign Application Priority Data

Jun. 18, 1992 [JP] Japan ................... 4-159848

[51] Int. Cl.[6] ........................................... F16H 59/16
[52] U.S. Cl. ........................ 477/115; 477/98; 477/121; 477/156
[58] Field of Search ............... 477/115, 121, 97, 98, 477/143, 156; 364/426.01, 426.03

[56] References Cited

U.S. PATENT DOCUMENTS

| | | | |
|---|---|---|---|
| 4,815,340 | 3/1989 | Iwatsuki et al. | 477/98 |
| 5,107,724 | 4/1992 | Takizawa | 477/97 |
| 5,249,484 | 10/1993 | Matsuoka et al. | 477/121 |
| 5,292,288 | 3/1994 | Kashiwabara et al. | 477/156 X |

FOREIGN PATENT DOCUMENTS 61-119432 6/1986 Japan.
62-152928 7/1987 Japan.
3-209048 9/1991 Japan.

*Primary Examiner*—Charles A. Marmor
*Assistant Examiner*—Peter Kwon
*Attorney, Agent, or Firm*—Foley & Lardner

[57] ABSTRACT

The present invention relates to technology wherein the torque input to an automatic transmission is estimated using an intake flow rate corrected by eliminating an intake flow rate friction component, the invention enabling the intake flow rate at the time of cool down to be accurately corrected. The characteristics of warm-up intake flow rate friction component versus engine rotational speed are pre-stored, and a warm-up intake flow rate friction component retrieved from an actual engine speed. A ratio for when the automatic transmission is in a non driving range, between the actual intake flow rate and the retrieved warm-up intake flow rate friction component is then obtained to set a correction coefficient. The warm-up intake flow rate friction component is then corrected by the most recently set correction coefficient, and this becomes the intake flow rate friction component.

15 Claims, 8 Drawing Sheets

| GEAR | KPLX |
|---|---|
| 1 | 0.334 |
| 2 | 0.334 |
| 3 | 0.206 |
| 4 | 0.472 |

FIG.5(B) GEAR AFTER GEAR CHANGE

GEAR BEFORE GEAR CHANGE

INXX VALUE

FIG.5(C) GEAR AFTER GEAR CHANGE

GEAR BEFORE GEAR CHANGE

MAP SELECTION $P_L$

TRQ

AUTOMATIC TRANSMISSON CONTROLLER

TECHNICAL FIELD

The present invention relates to an automatic transmission controller which controls at least one of the control elements of an automatic transmission such as, operating oil pressure, gear change timing, lockup range, based on a torque input to the automatic transmission which has been estimated using at least an engine intake air flow rate. This controller incorporates a correction device to correct the intake flow rate used in estimating the torque after eliminating a component of intake flow rate (referred to as flow rate friction component) which is not input to the transmission as the torque.

BACKGROUND ART

With conventional automatic transmission controllers such as disclosed in Japanese unexamined patent publication No. 3-209048 for example, the torque input to the automatic transmission is estimated from the air intake flow rate (referred to hereunder simply as flow rate) and the rotational speed of the engine. The operating oil pressure or other control element for the automatic transmission is then controlled on the basis of this estimated torque.

When the engine torque TQSEN is computed in this way using a flow rate Qa and an engine rotational speed Ne, then the torque consumed by the engine itself must be deducted.

In the controller of the above-mentioned publication, this is dealt with by determining a flow rate friction component Qfric based on the engine rotational speed Ne. The engine torque TQSEN is then obtained using the following equation, where K is a constant:

$$TQSEN = K \times (Qa - Qfric)/Ne$$

A problem arises however in that while the flow rate friction component Qfric can be determined at warm-up as shown in FIG. 9, from engine rotational speed Ne, additional temperature information is necessary for accurate determination at cool down.

The ideal temperature information in this respect is engine oil temperature. However since engine oil temperature is not used in other controls, this requires an extra sensor, thereby incurring additional costs.

Engine water temperature, oil (ATM) temperature and the like have been considered as possible alternatives. There are cases however wherein a rise in these temperatures does not show the same trend as that for engine oil temperature, so that they are somewhat lacking in accuracy as alternatives.

It is an object of the present invention, to address the above situation wherein the torque input to an automatic transmission is estimated using a flow rate corrected after eliminating a flow rate friction component, and be able to accurately correct the flow rate at the time of cool down without providing an additional sensor.

DISCLOSURE OF THE INVENTION

Therefore a controller for an automatic transmission according to the present invention comprises: a flow rate detection device for detecting an intake air flow rate of an engine; an effective flow rate computing device for computing an effective flow rate by subtracting a flow rate friction component, being a flow rate representing a component of the torque which is not input to the automatic transmission, from the detected flow rate; a torque estimation device for estimating the torque input to the automatic transmission on the basis of the computed effective flow rate; and a control device for controlling the automatic transmission on the basis of the estimated torque. The controller also incorporates any one of the following (1) through (4) constructions.

(1) A storage device for pre-storing characteristics of warm-up flow rate friction component versus engine rotational speed;

a warm-up flow rate friction component retrieval device for retrieving from the storage device, a warm-up flow rate friction component corresponding to an actual engine rotational speed;

a correction coefficient setting device for obtaining, when the automatic transmission is in a non driving range, a ratio between the actual flow rate and the warm-up flow rate friction component retrieved by the retrieval device, to thereby set a correction coefficient; and a flow rate friction component computing device for computing a flow rate friction component for use in the effective flow rate computing device, from the warm-up flow rate friction component retrieved by the retrieval device and the correction coefficient set by the correction coefficient setting device for when the automatic transmission is in the non driving range.

(2) A storage device for pre-storing characteristics of warm-up flow rate friction component versus engine rotational speed;

a warm-up flow rate friction component retrieval device for retrieving from the storage device, a warm-up flow rate friction component corresponding an actual engine speed;

a correction coefficient setting device for computing, when the automatic transmission is in a driving range and is not locked up, an actual flow rate friction component using the actual flow rate, engine rotational speed, and torque converter characteristic values, and obtaining a ratio between the computed actual flow rate friction component and the warm-up flow rate friction component retrieved by the retrieval device, to thereby set a correction coefficient; and a flow rate friction component computing device for computing a flow rate friction component for use in the effective flow rate computing device, from the warm-up flow rate friction component retrieved by the retrieval device and the correction coefficient set by the correction coefficient setting device for when the automatic transmission is in the driving range and is not locked up.

(3) A storage device for pre-storing characteristics of warm-up flow rate friction component versus engine rotational speed;

a warm-up flow rate friction component retrieval device for retrieving from the storage device, a warm-up flow rate friction component corresponding to an actual engine speed;

a correction coefficient setting device for obtaining, during feed back control of idle speed effected by an idle speed control valve in an auxiliary air path bypassing the engine throttle valve, a ratio between an actual opening area and a warm-up opening area of the idle speed control valve, to thereby set a correction coefficient; and a flow rate friction component computing device for computing a flow rate friction component for use in the effective flow rate computing device, from the warm-up flow rate friction component retrieved by the retrieval device and the correction coefficient set by the correction coefficient setting device for during idle speed control.

(4) In addition to any one of the constructions of (1) through (3); a correction coefficient time compensating device for compensating the correction coefficient set for predetermined driving conditions by the correction coefficient setting device, according to an elapsed time from engine start outside the predetermined driving conditions.

Operation of the present invention is as follows.

Basically, the characteristics of warm-up flow rate friction component versus engine speed are pre-stored, and a warm-up flow rate friction component corresponding to an actual engine speed is retrieved.

Then, for predetermined driving conditions, a ratio between an actual flow rate friction component and the retrieved warm-up flow rate friction component, or a value equivalent to the ratio, is obtained to set a correction coefficient.

In making a correction using the flow rate friction component, the warm-up flow rate friction component corrected by the correction coefficient is used.

In this case, with the construction of (1) above, all of the flow rate when the automatic transmission is in the non driving range is the flow rate friction component. Therefore when the automatic transmission is in the non driving range, the ratio between the actual flow rate friction component and the warm up flow rate friction component is obtained to set the correction coefficient.

With the construction of (2) above, when the automatic transmission is in the driving range and is not locked up, then the actual flow rate, engine rotational speed, and torque converter characteristic values are used to compute the actual flow rate friction component. The ratio between the computed actual flow rate friction component and the warm-up flow rate friction component is then obtained to set the correction coefficient.

With the construction of (3) above, during feedback control of the idling speed, the ratio between the actual opening area and the warm-up opening area of the idling speed control valve is obtained to set the correction coefficient.

With the construction of (4) above, the correction coefficient set for predetermined driving conditions is compensated according to the elapsed time outside the predetermined driving conditions from engine start.

BRIEF DESCRIPTION OF THE DRAWINGS

FIGS. 5A–5C show various maps used in the routine of FIG. 4.

BEST MODE FOR CARRYING OUT THE INVENTION

Figure 1:
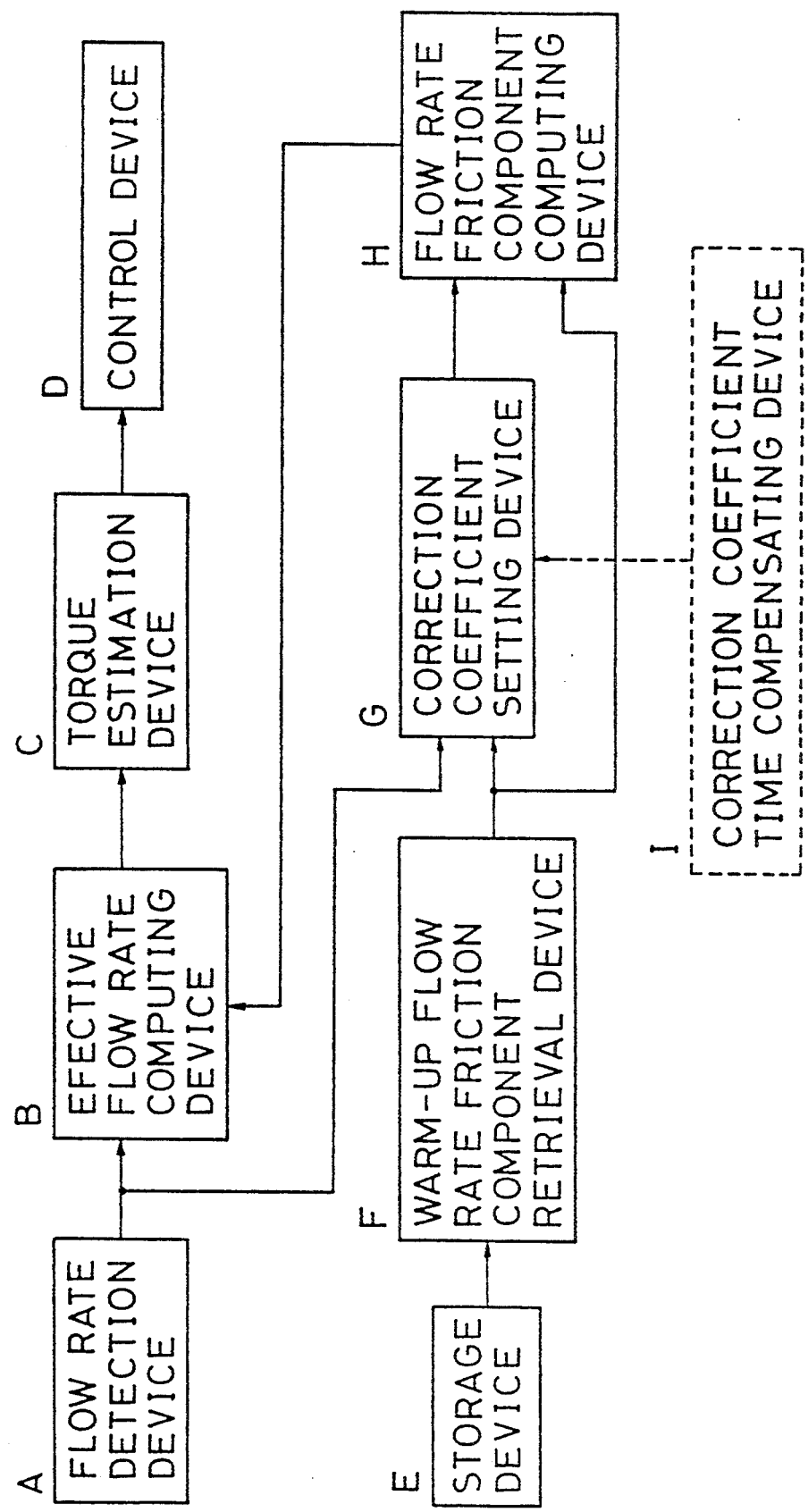
FIG. 1 is a functional block diagram illustrating a construction of the present invention.

FIG. 1 shows a basic construction according to the present invention. A flow rate detection device A detects an engine intake air flow rate. An effective flow rate computing device B then computes an effective flow rate by subtracting from the flow rate detected by the flow rate detection device A, a flow rate friction component, being a flow rate representing a component of the torque which is not input to the automatic transmission. A torque estimation device C then estimates a torque input to the automatic transmission on the basis of the effective flow rate computed by the effective flow rate computing device B. A control device D then controls the automatic transmission (more specifically at least one of the control elements such as operating oil pressure, gear change timing, or lock-up range) on the basis of the torque estimated by the torque estimation device C.

In this respect, the before-mentioned flow rate friction component is computed as follows.

The characteristics of the warm-up flow rate friction component versus engine rotational speed are pre-stored in a storage device E.

A warm-up flow rate friction component retrieval device F then retrieves from the storage device E, a warm-up flow rate friction component corresponding to the actual engine rotational speed.

A correction coefficient setting device G then obtains for predetermined driving conditions, a ratio between the actual flow rate friction component and the retrieved warm-up flow rate friction component, or a value equivalent to the ratio, to thereby set a correction coefficient.

More specifically, when the automatic transmission is in the non driving range, the ratio between the actual flow rate detected by the flow rate detection device A and the warm-up flow rate friction component retrieved by the retrieval device F is obtained to set the correction coefficient.

While the automatic transmission is in the driving range and is not locked up, then the actual flow rate friction component is computed using the actual flow rate, the engine rotational speed and the torque converter characteristic values, and the ratio between the computed actual flow rate friction component and the warm-up flow rate friction component retrieved by the retrieval device F is obtained to set the correction coefficient.

During feedback control of idle speed effected by an idle speed control valve in the auxiliary air path bypassing the engine throttle valve, a ratio between an actual opening area and a warm-up opening area of the idle speed control valve is obtained to set the correction coefficient.

If required, a correction coefficient time compensating device I compensates the correction coefficient set for predetermined driving conditions by the correction coefficient setting device G, according to an elapsed time outside the predetermined driving conditions from engine start.

A flow rate friction component computing device H computes a flow rate friction component for use in the effective flow rate computing device B, from the warm-up flow rate friction component retrieved by the retrieval device F, and the correction coefficient set for predetermined driving conditions by the correction coefficient setting device G and compensated as required by the correction coefficient time compensating device I.

As follows is a description of an embodiment of the present invention appropriately applied to a line pressure control apparatus for an automatic transmission.

Figure 2:
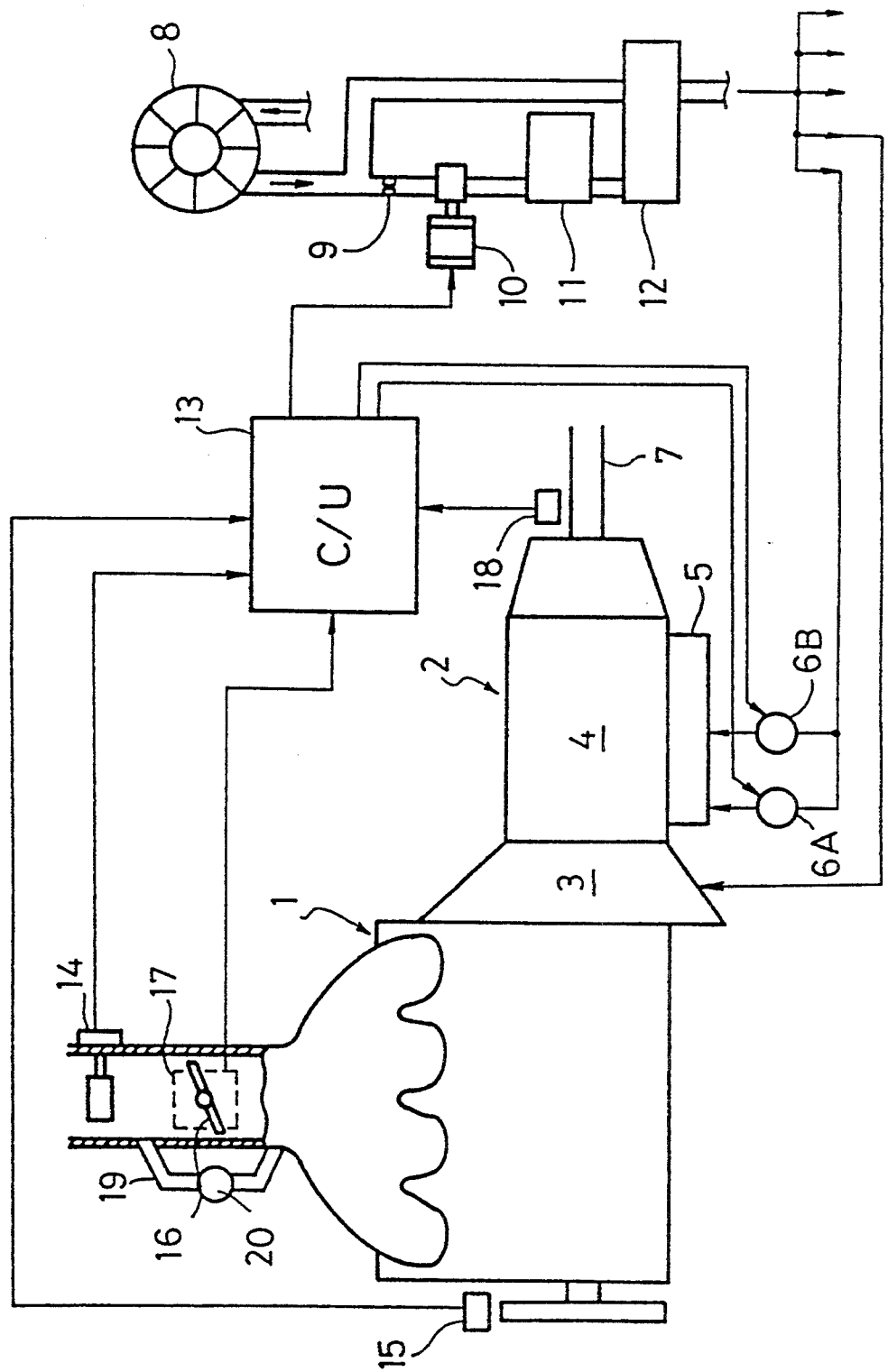
FIG. 2 is a block diagram illustrating an embodiment according to the present invention.

As shown in FIG. 2, an engine 1 has an automatic transmission 2 provided on the output side thereof. The automatic transmission 2 comprises a torque converter 3 interfacing with the engine 1, a gear type speed changer 4 connected to the engine 1 output by way of the torque converter 3, and a hydraulic actuator 5 whereby various speed change elements in the gear type speed changer 4 may be engaged and disengaged. The operating pressure for the hydraulic actuator 5 may be turned on and off by means of various solenoid valves. In the present case however, only shift solenoid valves 6A, 6B for the automatic transmission shift are shown. Numeral 7 indicates an output shaft from the automatic transmission 2.

An oil pump 8 driven by an input shaft of the gear type speed changer, together with an orifice 9, a solenoid valve 10, a pressure modifier valve 11 and a pressure regulator valve 12, are provided in order to obtain a line pressure to operate the torque converter 3 and the hydraulic actuator 5.

The solenoid valve 10 which is duty controlled as described later, outputs a pilot pressure based on a discharge pressure of the flow of the oil pump 8 passing via the orifice 9. This pilot pressure is then amplified by the pressure modifier valve 11. The pressure regulator valve 12 then adjusts the oil pump 8 discharge pressure to give a line pressure proportional to the pilot pressure from the pressure modifier valve 11, which is fed to the hydraulic circuit of the torque converter 3 and the hydraulic actuator 5.

Signals from various sensors are input to a control unit 13.

The various sensors include a hot wire type air flow meter 14 for detecting the flow rate Qa in the engine 1 intake system.

A crank angle sensor 15 is provided adjacent the crank shaft of the engine 1 or adjacent a shaft rotating at the same speed as the crank shaft. Engine rotational speed Ne is computed from the frequency of pulse signals from the crank angle sensor 15. For example the frequency of pulse signals per reference crank angle.

A potentiometer type throttle valve sensor 17 is provided for sensing the opening (TVO) of a throttle valve 16 in the air intake system of the engine 1.

A vehicle speed sensor 18 is provided for detecting the vehicle speed (VSP) on the basis of a rotation signal from the output shaft 7 of the automatic transmission 2.

In the FIG. 2, numeral 19 indicates an auxiliary air path for bypassing the throttle valve 16, while numeral 20 indicates an idle speed control valve provided in the auxiliary air path 19 for duty control.

The control unit 13 which mainly controls the speed change and line pressure, incorporates a micro-computer.

Speed change control involves control of the speed change to conform to the operating position of a select lever. More specifically, when the select lever is in a D-range condition, a speed change position from speed 1 to speed 4 is automatically set in accordance with the throttle valve opening TVO and the vehicle speed VSP, and the ON/OFF combinations of the shift solenoid valves 6A, 6B controlled so as to move the gear type speed changer 4 to the position automatically set with the hydraulic actuator 5.

Figure 3:
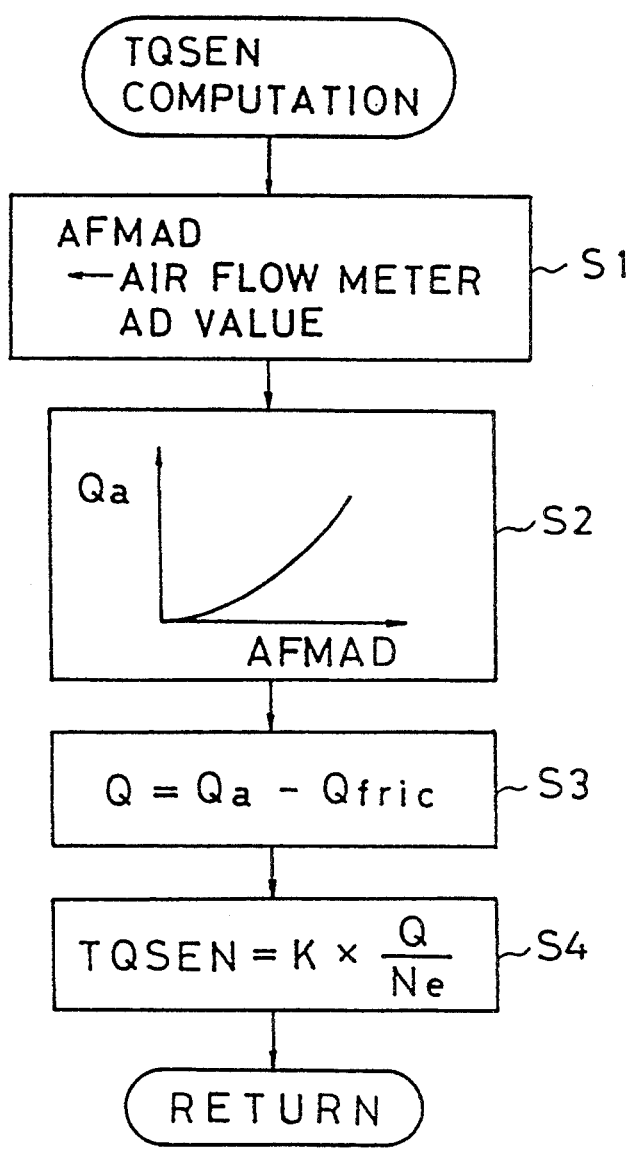
FIG. 3 is a flow chart of an engine torque computing routine.
Figure 4:
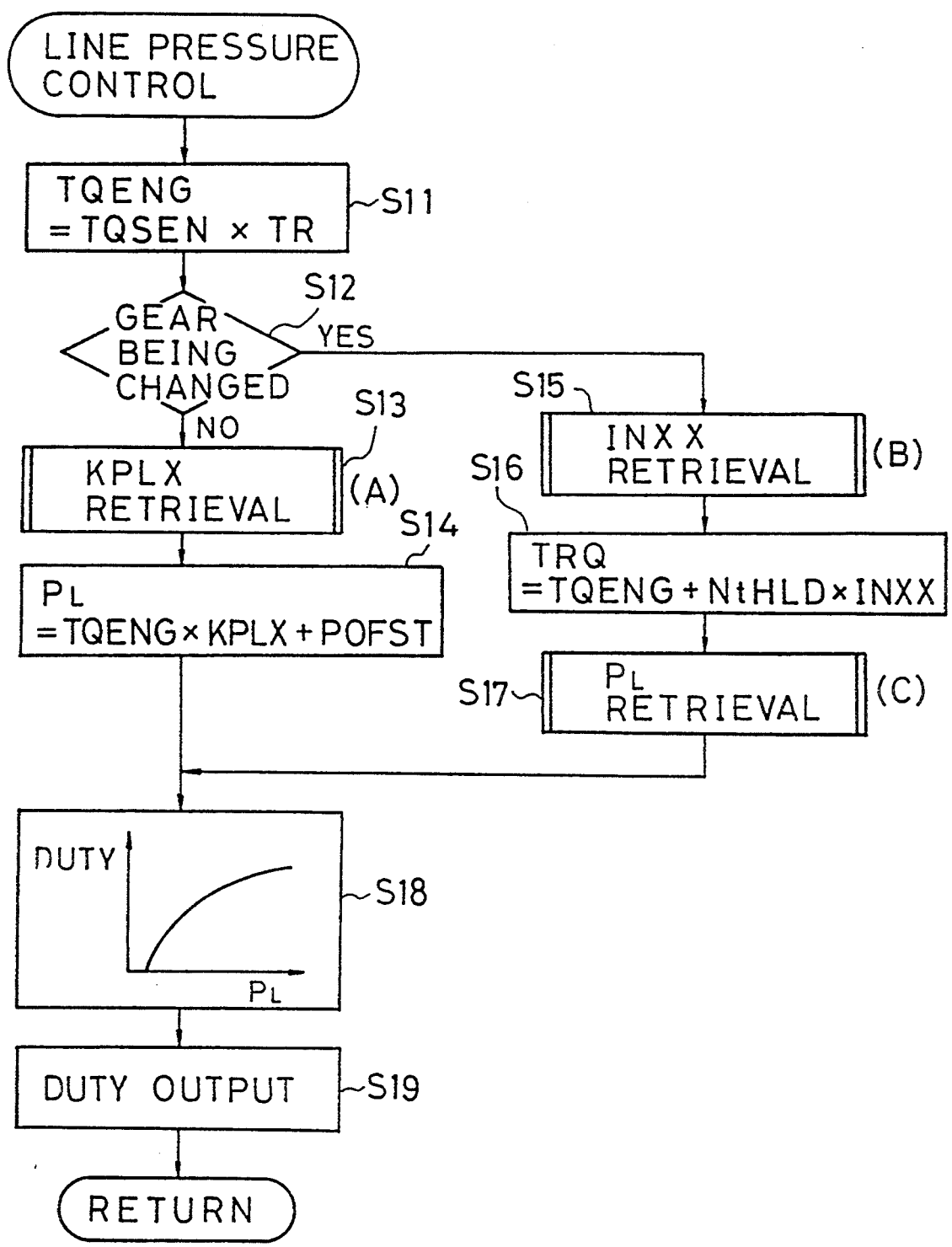
FIG. 4 is a flow chart of a line pressure control routine.

The line pressure control is carried out by duty control of the solenoid valve 10 in accordance with the routines illustrated by the flow charts of FIG. 3 and FIG. 4. Here, by increasing the duty (the percentage of time that the valve is open) the line pressure can be increased.

FIG. 3 illustrates an engine torque (TQSEN) computing routine.

In step 1 (indicated by S1 in the figure, and similarly with subsequent steps) an output voltage from the air flow meter 14 is read and converted to a digital signal (A/D converted) to become AFMAD.

In step 2, the map is referred to for a linearization process, and the flow rate Qa retrieved from the A/D converted value AFMAD. Accordingly, the parts of step 1 and step 2 together with the air flow meter 14 correspond to the flow rate detection device.

In step 3, in order to make friction correction, the flow rate friction component Qfric set by the routine of FIG. 6 or FIG. 7 (to be discussed later) is subtracted from the flow rate Qa according to the following equation, to compute the actual flow rate Q. This part corresponds to the effective flow rate computing device.

$$Q = Qa - Qfric$$

In step 4, the engine torque TQSEN is computed from the effective flow rate Q and the engine speed Ne, by the following equation where K is a constant. This part corresponds to the torque estimation device.

$$TQSEN = K \times (Q/Ne)$$

FIG. 4 illustrates a line pressure control routine. This corresponds to the control device.

In step 11, the transmission input torque TQENG is computed from the engine torque TQSEN and the torque ratio TR of the torque converter by the following equation.

$$TQENG = TQSEN \times TR$$

Step 12 corresponds to judgement of whether or not the gear is being changed.

Figure 5A:
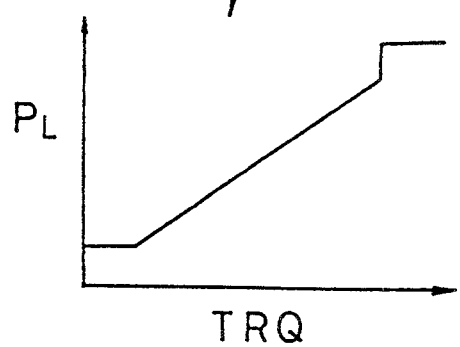

If the gear is not being changed, then in step 13 the map of FIG. 5(A) is referred to and the torque/hydraulic pressure conversion coefficient KPLX retrieved from the gear position. Then, in step 14, the line pressure $P_L$ is computed from the transmission input torque TQENG, the torque/hydraulic conversion coefficient KPLX, and the predetermined offset pressure POFST by the following equation. Control then proceeds to step 18.

$$P_L = TQENG \times KPLX + POFST$$

If the gear is being changed, then in step 15 the map of FIG. 5(B) is referred to and the inertia INXX retrieved from the gear positions before and after gear change. Then, in step 16, the torque $TRQ = TQENG + NtHLD \times INXX$ is computed from the transmission input torque TQENG, the turbine rotational speed NtHLD at the start of gear change, and the inertia INXX. In step 17 a map is selected from the gear positions before and after gear change as shown in FIG. 5(C). The line pressure $P_L$ is retrieved from the torque TRQ on the basis of the selected map. Control then proceeds to step 18.

In step 18, the map is referred to and the computed line pressure $P_L$ converted to DUTY.

In step 19, this duty DUTY is output to drive the solenoid valve 10 to give the optimum line pressure.

Next is a description of a routine for computing the flow rate friction component Qfric used in step 3 of the routine of FIG. 3.

Figure 6:
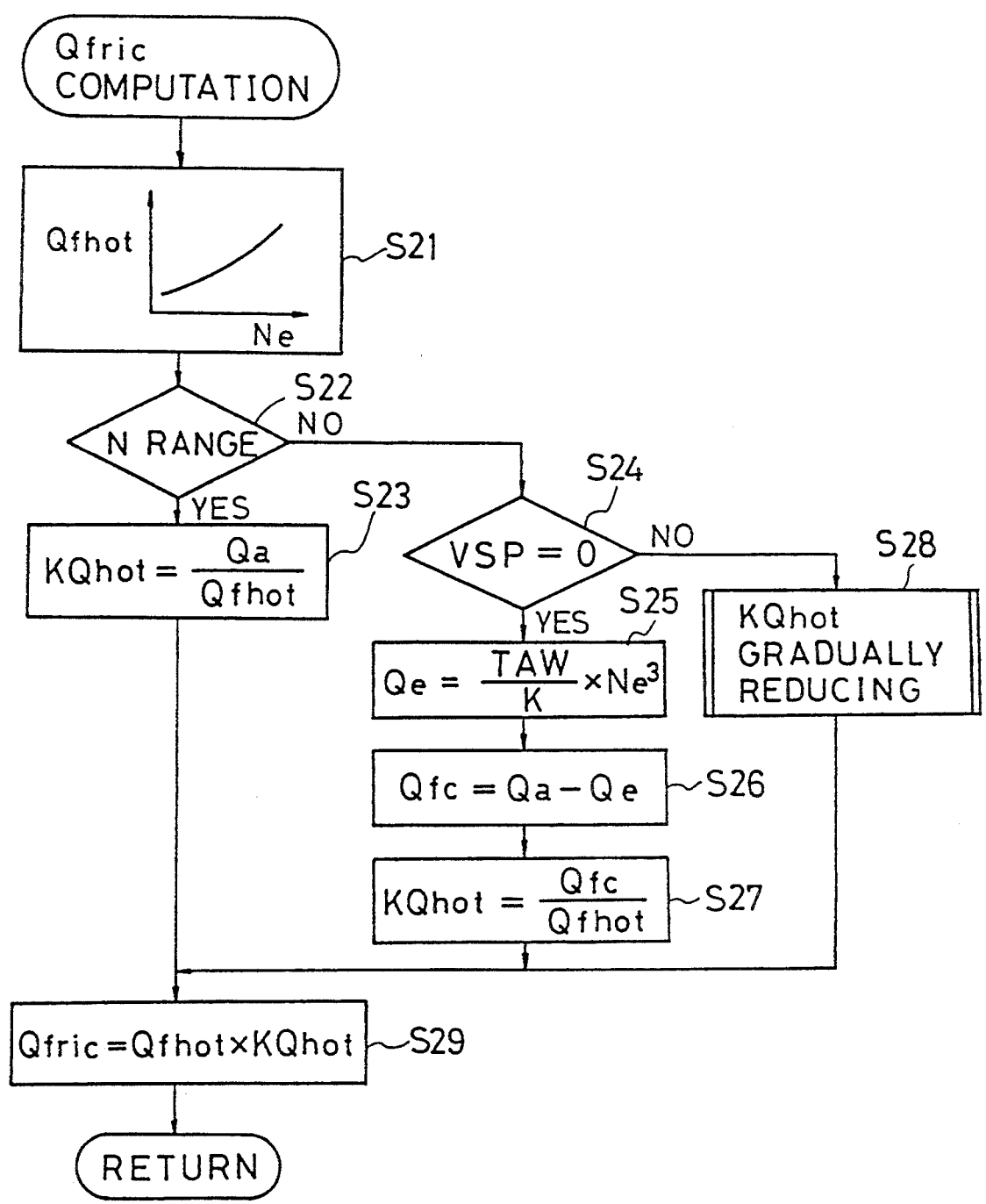
FIG. 6 is a flow chart of a flow rate friction component computing routine.

FIG. 6 shows one example of a computing routine for the flow rate friction component (Qfric).

In step 21, a map as a storage device wherein characteristics of the warm-up flow rate friction component Qfhot versus engine rotational speed Ne are pre-stored is referred to, and the warm-up flow rate friction component Qfhot retrieved from the actual engine rotational speed Ne. This part corresponds to the warm-up flow rate friction component retrieval device.

In step 22, it is judged if the automatic transmission is in the non driving N range.

If in the N range, since torque is not transmitted from the engine to the automatic transmission, then all of the flow rate Qa becomes the flow rate friction component. Accordingly, if the flow rate friction component correction coefficient KQhot is determined as the ratio of the actual flow rate friction component Qfc to the warm-up flow rate friction component Qfhot (KQhot=Qfc/Qfhot), then in the N range, the flow rate friction component correction coefficient KQhot can be computed as the ratio of the actual flow rate Qa to the warm-up flow rate friction component Qfhot (KQhot=Qa/Qfhot).

Consequently, in the N range, control proceeds to step 23, and the flow rate friction component correction coefficient KQhot is computed as the ratio of the actual flow rate Qa to the warm-up flow rate friction component Qfhot according to the following equation.

$$KQhot = Qa/Qfhot$$

When not in the N range, control proceeds to step 24, where it is judged if the vehicle is stopped (vehicle speed VSP=0). When the vehicle is stopped the torque conveter is also in the non locked up state.

If the vehicle is stopped (vehicle speed VSP=0), control proceeds to step 25 and the effective flow rate Qe is computed from the engine rotational speed Ne and the stalling capacity coefficient TAW (the value when the speed ratio of the torque converter input capacity coefficient t is zero) by the following equation.

$$Qe = (TAW/K) \times Ne^3$$

The above equation is derived as follows. The relationship $Te = TAW \times Ne^2$ is obtained from the torque converter characteristics, while the relationship $Te = K \times (Qe/Ne)$ is obtained from Qa. Hence eliminating Te in these equations gives $Qe = (TAW/K) \times Ne^3$.

Then in step 26, the actual flow rate friction component Qfc is computed by subtracting the effective flow rate Qe from the actual flow rate Qa according to the following equation.

$$Qfc = Qa - Qe$$

Subsequently in step 27, the flow rate friction component correction coefficient KQhot is computed as the ratio of the actual flow rate friction component Qfc to the warm-up flow rate friction component Qfhot by the following equation.

$$KQhot = Qfc/Qfhot$$

The reason for carrying out the relevant calculations for when the vehicle is stopped, is because it is sufficient to know the value for TAW when the speed ratio of the torque converter input capacity coefficient t is zero. Accordingly, there may be other situations apart from this where the calculations can be made, provided the torque converter is not locked up.

Figure 8:
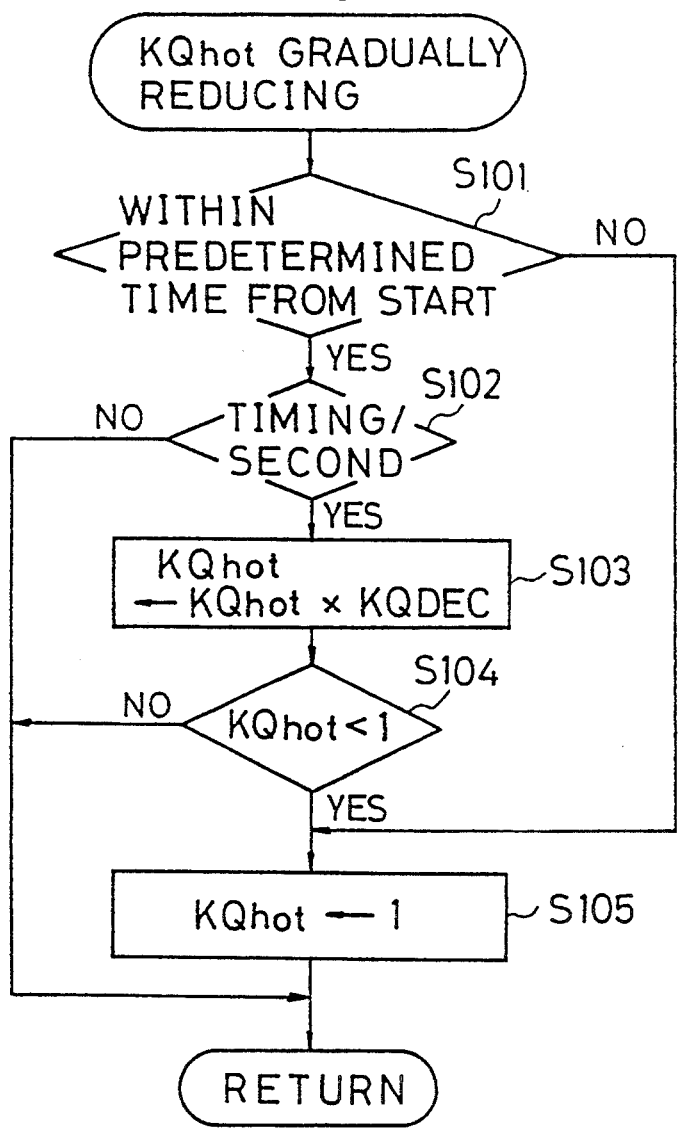
FIG. 8 is a flow chart of a sub-routine for a gradually reducing correction coefficient.
Figure 9:
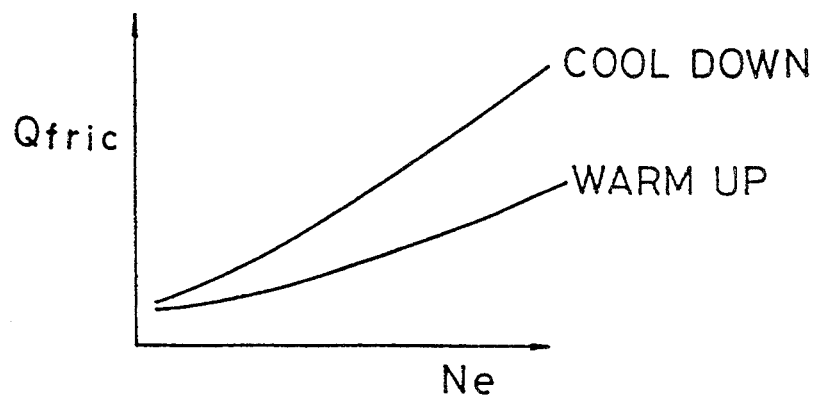
FIG. 9 is a graph showing a relationship between flow rate friction component and engine rotational speed.

When the vehicle is not stopped (VSP≠0), control proceeds to step 28, and through execution of the gradually reducing correction coefficient (KQhot) sub-routine of FIG. 8, the flow rate friction component correction coefficient KQhot is gradually reduced with elapsed time from engine start to finally converge at 1.

That is to say, in step 101 of FIG. 8, it is judged if the time is within a predetermined time from engine start. If within the predetermined time, control proceeds to step 102, and it is judged if KQhot setting timing is for each second.

In the case of YES, control proceeds to step 103, and the flow rate friction component correction coefficient KQhot is multiplied by a predetermined reduction ratio coefficient KQDEC (for example 0.99) according to the following equation, to gradually reduce the flow rate friction component correction coefficient KQhot, and thereby set a new flow rate friction component correction coefficient KQhot.

$$KQhot \leftarrow KQhot \times KQDEC$$

Next in step 104, it is judged if the flow rate friction component correction coefficient KQhot is smaller than 1. If smaller than 1, control proceeds to step 105 to set KQhot=1.

When a predetermined time has elapsed since engine start, control proceeds from step 1 01 to step 105 to set KQhot=1.

The parts of steps 22 through 27 of FIG. 6 correspond to the correction coefficient setting device, while the part of step 28 corresponds to the correction coefficient time compensating device.

In step 29 of FIG. 6, the flow rate friction component Qfric is computed by multiplying the warm-up flow rate friction component Qfhot by the correction coefficient KQhot according to the following equation. This part corresponds to the flow rate friction component computing device.

$$Qfric = Qfhot \times KQhot$$

Figure 7:
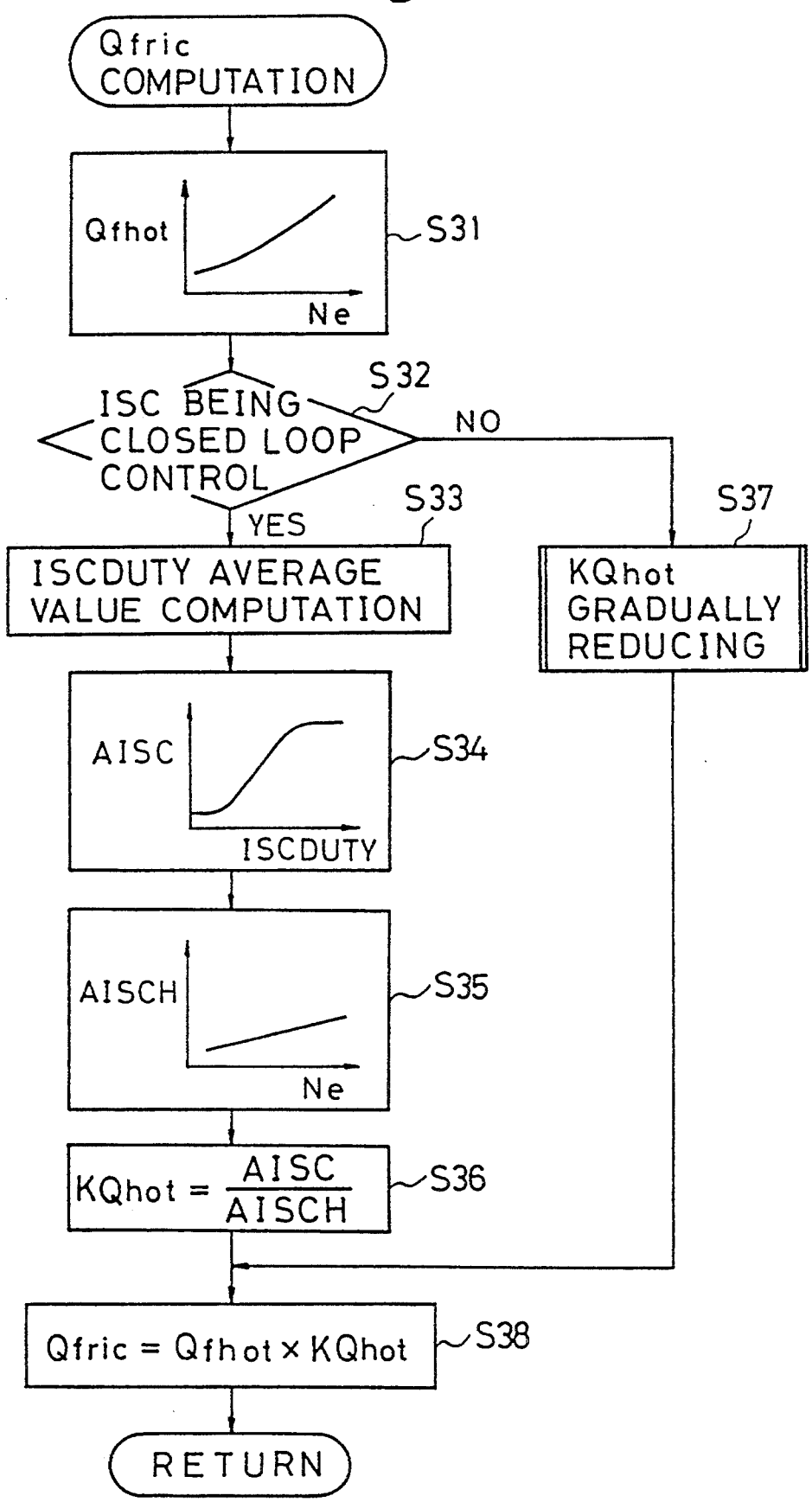
FIG. 7 is a flow chart illustrating another example of a flow rate friction component computing routine.

FIG. 7 shows another example of a flow rate friction component (Qfric) computing routine.

In step 31, the map as a storage device wherein characteristics of the warm-up flow rate friction component Qfhot versus engine rotational speed Ne are pre-stored is referred to, and the warm-up flow rate friction component Qfhot retrieved from the actual engine rotational speed Ne. This part corresponds to the warm-up flow rate friction component retrieval device.

In step 32, it is judged if idle speed feedback control is being carried out by the idle speed control valve 20 (ISC being closed loop control).

If idle speed feedback control is being carried out, control proceeds to step 33, and the average value of the duty (ISCDUTY) output to the idle speed control valve 20 computed.

Next in step 34, the map is referred to, and the actual opening area (AISC) of the idle speed control valve 20 retrieved from this average value of the duty (ISCDUTY).

Subsequently in step 35, the map is referred to, and the warm-up opening area (warm-up normal opening area) AISCH of the idle speed control valve 20 retrieved from the engine rotational speed Ne.

Then in step 36, the flow rate friction component correction coefficient KQhot is computed as a ratio of the actual opening area AISC to the warm-up opening area AISCH according to the following equation.

$$KQhot = AISC/AISCH$$

When idle speed feedback control is not being carried out, control proceeds to step 37, and through execution of the gradually reducing correction coefficient (KQhot) sub-routine of FIG. 8, the flow rate friction component correction coefficient KQhot is gradually reduced with elapsed time from engine start to finally converge at 1.

The parts of steps 32 through 36 of FIG. 7 correspond to the correction coefficient setting device, while the part of step 37 corresponds to the correction coefficient time compensating device.

In step 38, the flow rate friction component Qfric is computed by multiplying the warm-up flow rate friction component Qfhot by the correction coefficient KQhot according to the following equation. This part corresponds to the flow rate friction component computing device.

$$Qfric = Qfhot \times KQhot$$

The above description is of an embodiment applicable to the line pressure control of an automatic transmission. This embodiment however is also applicable to the control of the automatic transmission gear change timing or elements such as for lockup region control.

INDUSTRIAL APPLICABILITY

With the present invention as described above, in the situation wherein the torque input to an automatic transmission is estimated using an intake flow rate corrected by eliminating a flow rate friction component, the flow rate at the time of cool down can be accurately corrected without providing an additional sensor.

Accordingly, the invention has wide application in the industrial field.

I claim:

1. A control apparatus for an automatic transmission including: flow rate detection means for detecting an intake air flow rate of an engine; effective flow rate computing means for computing an effective flow rate by subtracting a flow rate friction component, being a flow rate corresponding to a component of the torque which is not input to the automatic transmission, from the detected flow rate; torque estimation means for estimating the torque input to the automatic transmission on the basis of the computed effective flow rate; and control means for controlling the automatic transmission on the basis of the estimated torque, said control apparatus comprising:
    storage means for pre-storing characteristics of warm-up flow rate friction component versus engine rotational speed;
    warm-up flow rate friction component retrieval means for retrieving from the storage means, a warm-up flow rate friction component corresponding to an actual engine speed;
    correction coefficient setting means for obtaining, when the automatic transmission is in a non driving range, a ratio between an actual flow rate and a warm-up flow rate friction component retrieved by said retrieval means, to thereby set a correction coefficient; and
    flow rate friction component computing means for computing a flow rate friction component for use in the effective flow rate computing means, from the warm-up flow rate friction component retrieved by said retrieval means and the correction coefficient set by the correction coefficient setting means for when the automatic transmission is in the non driving range.

2. A control apparatus for an automatic transmission as claimed in claim 1, comprising correction coefficient time compensating means for compensating the correction coefficient set for predetermined driving conditions by the correction coefficient setting means, according to an elapsed time from engine start outside the predetermined driving conditions.

3. A control apparatus for an automatic transmission as claimed in claim 1, wherein said control means controls an operating oil pressure of the automatic transmission.

4. A control apparatus for an automatic transmission as claimed in claim 1, wherein said control means controls a gear change timing of the automatic transmission.

5. A control apparatus for an automatic transmission as claimed in claim 1, wherein said control means controls a lock-up range of the automatic transmission.

6. A control apparatus for an automatic transmission including: flow rate detection means for detecting an intake air flow rate of an engine; effective flow rate computing means for computing an effective flow rate by subtracting a flow rate friction component, being a flow rate corresponding to a component of the torque which is not input to the automatic transmission, from the detected flow rate; torque estimation means for estimating the torque input to the automatic transmission on the basis of the computed effective flow rate; and control means for controlling the automatic transmission on the basis of the estimated torque, said control apparatus comprising:
    storage means for pre-storing characteristics of warm-up flow rate friction component versus engine rotational speed;
    warm-up flow rate friction component retrieval means for retrieving from the storage means, a warm-up flow rate friction component corresponding to an actual engine speed;
    correction coefficient setting means for computing, when the automatic transmission is in a driving range and is not locked up, an actual flow rate friction component using the actual flow rate, engine rotational speed, and torque converter characteristic values, and obtaining a ratio between the computed actual flow rate friction component and the warm-up flow rate friction component retrieved by said retrieval means, to thereby set a correction coefficient; and flow rate friction component computing means for computing a flow rate friction component for use in the effective flow rate computing means, from the warm-up flow rate friction component retrieved by said retrieval means and the correction coefficient set by said correction coefficient setting means for when the automatic transmission is in the driving range and is not locked up.

7. A control apparatus for an automatic transmission as claimed in claim 6, comprising correction coefficient time compensating means for compensating the correction coefficient set for predetermined driving conditions by the correction coefficient setting means, according to an elapsed time from engine start outside the predetermined driving conditions.

8. A control apparatus for an automatic transmission as claimed in claim 6, wherein said control means controls an operating oil pressure of the automatic transmission.

9. A control apparatus for an automatic transmission as claimed in claim 6, wherein said control means controls a gear change timing of the automatic transmission.

10. A control apparatus for an automatic transmission as claimed in claim 6, wherein said control means controls a lock-up range of the automatic transmission.

11. A control apparatus for an automatic transmission including: flow rate detection means for detecting an intake air flow rate of an engine; effective flow rate computing means for computing an effective flow rate by subtracting a flow rate friction component, being a flow rate corresponding to a component of the torque which is not input to the automatic transmission, from the detected flow rate; torque estimation means for estimating the torque input to the automatic transmission on the basis of the computed effective flow rate; and control means for controlling the automatic transmission on the basis of the estimated torque, said control apparatus comprising:

storage means for pre-storing characteristics of warm-up flow rate friction component versus engine rotational speed;

warm-up flow rate friction component retrieval means for retrieving from the storage means, a warm-up flow rate friction component corresponding to an actual engine speed;

correction coefficient setting means for obtaining, during feed back control of idle speed effected by an idle speed control valve in an auxiliary air path bypassing the engine throttle valve, a ratio between actual opening area and a warm-up opening area of the idle speed control valve, to thereby set a correction coefficient; and flow rate friction component computing means for computing a flow rate friction component for use in the effective flow rate computing means, from the warm-up flow rate friction component retrieved by the retrieval means and the correction coefficient set by the correction coefficient setting means for during idle speed control.

12. A control apparatus for an automatic transmission as claimed in claim 11, comprising correction coefficient time compensating means for compensating the correction coefficient set for predetermined driving conditions by the correction coefficient setting means, according to an elapsed time from engine start outside the predetermined driving conditions.

13. A control apparatus for an automatic transmission as claimed in claim 11, wherein said control means controls an operating oil pressure of the automatic transmission.

14. A control apparatus for an automatic transmission as claimed in claim 11, wherein said control means controls a gear change timing of the automatic transmission.

15. A control apparatus for an automatic transmission as claimed in claim 11, wherein said control means controls a lock-up range of the automatic transmission.

* * * * *